US008456782B2

(12) United States Patent
Annis et al.

(10) Patent No.: US 8,456,782 B2

(45) Date of Patent: Jun. 4, 2013

(54) COST EFFECTIVE DESIGN FOR A CURRENT TRANSFORMER WITH AN INTEGRATED MAGNETIC ACTUATOR

(75) Inventors: Jeffrey Annis, Waukesha, WI (US); Hans Weichert, Granichen (CH); Sandro Liberto, Aarau Rohr (CH); Beat Villiger, Reinach (CH)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 28 days.

(21) Appl. No.: 13/177,946

(22) Filed: Jul. 7, 2011

(65) Prior Publication Data

US 2011/0267722 A1 Nov. 3, 2011

Related U.S. Application Data

(63) Continuation-in-part of application No. 12/762,894, filed on Apr. 19, 2010.

(60) Provisional application No. 61/176,677, filed on May 8, 2009.

(30) Foreign Application Priority Data

Mar. 26, 2010 (EP) .................................... 10158680

(51) Int. Cl.
*H02H 7/04* (2006.01)

(52) U.S. Cl.
USPC .............. 361/38; 361/49; 361/93.6; 361/115; 324/127

(58) Field of Classification Search
None
See application file for complete search history.

(56) References Cited

U.S. PATENT DOCUMENTS 3,566,320 A 2/1971 Bakes
3,688,227 A * 8/1972 Hong ................................ 335/7

(Continued)

FOREIGN PATENT DOCUMENTS

| | | | |
|---|---|---|---|
| DE | 19721591 | A1 | 4/2010 |
| EP | 0626713 | A1 | 11/1994 |
| EP | 1551039 | A2 | 4/2010 |
| WO | 0150569 | A2 | 7/2001 |

OTHER PUBLICATIONS

ABB: "Emax Low Voltage Air Circuit-breakers. Technical Catalogue". Dec. 2008, pp. 1-278, XP002596845. http://www05.abb.com/global/scot/scot209.nsf/veritydisplay/3188b874c09378c2c12575a100532717/$File/1SDC200006D0206.pdf. Last accessed on Aug. 17, 2010, 16 pages.
European Search Report for EP Application No. 10158680.8-2214, dated Aug. 31, 2010, 11 pages.
OA dated Jun. 22, 2012 for U.S. Appl. No. 12/762,894, 26 pages.

*Primary Examiner* — Jared Fureman
*Assistant Examiner* — Terrence Willoughby
(74) *Attorney, Agent, or Firm* — William R. Walbrun; Turocy & Watson, LLP; John M. Miller

(57) ABSTRACT

A system comprising a magnetic actuator, a current transformer and operational electronics in a dual-coil circuit breaker. The system includes an inline, but non concentric, implementation of the primary and secondary coils to maintain a narrow width suitable for retrofitting in standard industrial rack mounted enclosures. The system further comprises a split core design that is integrated into an upper and lower plate which slide together and are retained by a secondary coil bobbin. Typically, the two parts of the split core can be manufactured into net shapes by utilizing a powder metal or metal injection molding process. Moreover, the split core design disclosed herein can reduce costs and time associated with manufacturing and assembly of the current transformer.

20 Claims, 16 Drawing Sheets

U.S. PATENT DOCUMENTS

| | | | | |
|---|---|---|---|---|
| 3,760,309 | A * | 9/1973 | McIntosh et al. | 335/1 |
| 3,932,791 | A * | 1/1976 | Oswald | 361/100 |
| 5,532,895 | A | 7/1996 | Chiu | |
| 5,726,846 | A | 3/1998 | Houbre | |
| 6,414,575 | B1 | 7/2002 | Swift | |
| 6,445,268 | B1 | 9/2002 | Daum | |
| 6,560,084 | B1 * | 5/2003 | Bilac et al. | 361/93.1 |
| 7,012,800 | B2 | 3/2006 | Busch et al. | |
| 2004/0145846 | A1 | 7/2004 | Fasano | |

* cited by examiner

COST EFFECTIVE DESIGN FOR A CURRENT TRANSFORMER WITH AN INTEGRATED MAGNETIC ACTUATOR

CROSS-REFERENCE TO RELATED APPLICATIONS

This application is a continuation in part of U.S. application Ser. No. 12/762,894, filed on Apr. 19, 2010, entitled "CURRENT TRANSFORMER WITH INTEGRATED ACTUATOR," which claims priority from European Application No. 10158680.8, filed on Mar. 26, 2010, and U.S. Application No. 61/176,677, filed on May 8, 2009. The entireties of each of the foregoing applications are incorporated herein by reference.

TECHNICAL FIELD

The subject application relates to industrial control systems and, more particularly, to systems and methods that provide a magnetic core and/or coil former design to reduce cost of manufacturing and/or assembling a current transformer having an integrated magnetic actuator.

BACKGROUND

Typical current motor protection circuit breakers, for rated currents up to approximately one hundred amperes, are designed with bimetal strips/heaters for thermal protection and magnetic plungers for short circuit protection. The operation of these devices produces a significant amount of power loss in the form of heat. The trend of government regulation and public opinion is towards a reduction in power consumption of all electrical devices, creating market pressure for more efficient electrical device designs. Further, reduced operating expenses are available to encourage the use of the design in new applications and to offset the cost of retrofitting existing applications with a more efficient circuit breaker.

Another shortcoming in the design of this class of conventional circuit breakers is the lack of integrated electronics for measuring circuit breaker conditions and the ability to communicate this data to a control system or network. Greater efficiency of operation and preventative maintenance opportunities are lost because the first sign of a problem with the circuit breaker is after the circuit breaker failure. Further, a high form factor with regard to the design's operational characteristics in this class of circuit breaker, such as speed of contact opening, prevention from reclosing, and/or prevention from welding, leads to higher manufacturing cost.

SUMMARY

The following presents a simplified summary in order to provide a basic understanding of some aspects of the disclosed embodiments. This summary is not an extensive overview, and it is not intended to identify key or critical elements or to delineate the scope. Its sole purpose is to present some concepts in a simplified form as a prelude to the more detailed description presented later.

The systems and methods disclosed herein provide short circuit protection in a reduced form factor fitting and smaller enclosures, while reducing manufacturing costs. According to an aspect, the system comprises a cost effective inline dual coil design for a current transformer (CT) core that included an integrated magnetic actuator. Moreover, the current transformer employs a dual coil winding system of separate, but inline, coils to reduce the physical dimensions of the circuit breaker enclosure. Typically, the inline design allows the coil windings of the plunger system to act as the primary coil of a current transformer providing power for the embedded electronics. Further, an integrated magnetic actuator is included to provide fast contact opening when a short circuit is detected. In one aspect, the design provides a CT-core that is split into two portions and integrated into an upper and lower plate, which slide together and are retained by the secondary coil former (bobbin).

According to an aspect, a system for a current transformer comprises: a primary coil component for providing current based short circuit protection; and a secondary coil component for providing voltage based overload protection; that are connected by upper and lower plates. In particular, a first portion of the current transformer core is integrated into the upper plate and a second portion of the current transformer core is integrated into the lower plate, for example, by employing powder metal or metal injection molding processes. Moreover, the upper and lower plates, with the respective portions of the core, slide together at the split core and be retained by the secondary coil former. Typically, the coil formers can utilize a snap-on mechanism and/or a slide-in mechanism to attach to and retain at least one of the plates.

To the accomplishment of the foregoing and related ends, certain illustrative aspects of the disclosed embodiments are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
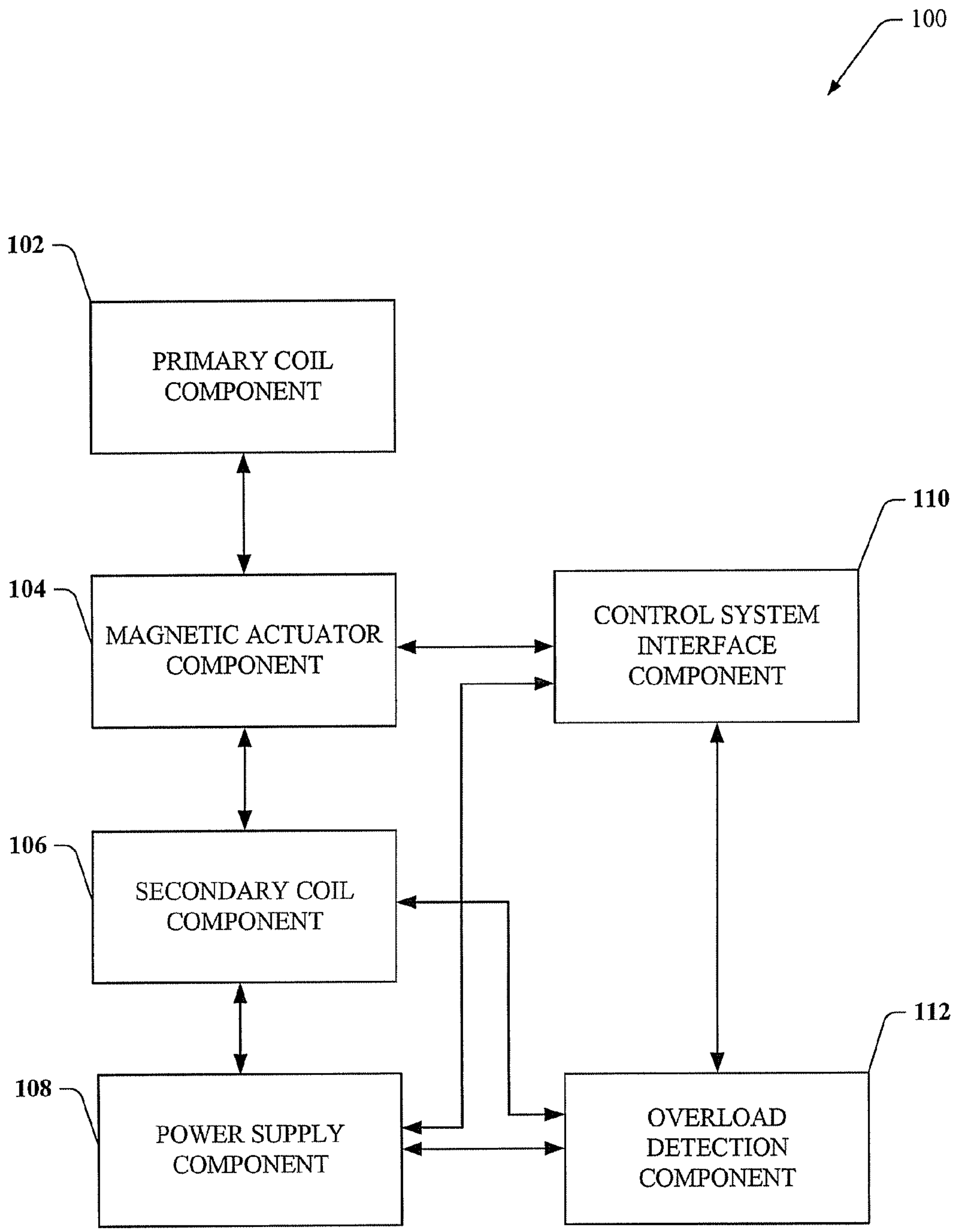
FIG. 1 depicts a block diagram of a current transformer with an integrated magnetic actuator and embedded electronics for measurement and communications.

The embodiments are now described with reference to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details or with other methods, components, materials, etc. In other instances, well-known structures and devices are shown in block diagram form in order to facilitate a description thereof.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer, an industrial controller, a relay, a sensor and/or a variable frequency drive. By way of illustration, both an application running on a controller and the controller can be a component. One or more components can reside within a process and/or thread of execution, and a component can be localized on one computer and/or distributed between two or more computers. As another example, an interface can include I/O components as well as associated processor, application, and/or API components.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a variable frequency drive and/or controller, to implement the disclosed subject matter. The term "article of manufacture" as used herein is intended to encompass a computer program accessible from any computer-readable device or computer-readable storage/communications media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring to the drawings, FIG. 1 depicts a block diagram of a dual coil system 100 for a current transformer with an integrated magnetic actuator, and embedded electronics for measurement and communications. According to an embodiment, the dual coil system 100 includes a primary coil component 102, a combined magnetic actuator/current transformer (CT)-core component 104, a secondary coil component 106, a power supply component 108, a control system interface component 110 and an overload detection component 112. In one example, the current transformer can be utilized in a circuit breaker. Typically, the dual coil system 100 can provide a cost effective integration of electronic overload protection into standard-sized motor protection circuit breakers, especially of relatively small frame sizes (e.g., up to 63A, 140M-D, and 140M-F). Moreover, the current transformer measures a current flowing through a power system and inputs the measured current to an overload protection system, for example, that causes a circuit breaker to trip if the current is above a specific threshold. In one example, the secondary coils from all three phases are connected through a rectifying bridge and provide power for the device (power supply component 108). In another example, an external power supply to this device, can also be utilized, but cannot be as cost effective and can require additional wiring.

The primary coil component 102 is the current coil and provides sufficient windings to provide power for the power supply component 108, the control system interface component 110 and/or the overload detection component 112, and to act as the measurement device for the primary current. The primary coil component 102 wraps a plunger component and is implemented separately from the secondary coil component 106, but in-line with the secondary coil component 106 to reduce enclosure size requirements. Typically, the primary coil component 102 and the secondary coil component 106 are connected by an upper and lower plate. In one aspect, the spilt core design utilized is integrated into the upper and/or lower plate. As an example, the upper and lower plate with the integrated split core can be manufactured into various shapes, using powder metal or metal injection molding processes. Typically, the two molded parts can simply slide together at the split core and be retained by the secondary bobbin of the secondary coil component 106. Moreover, integrating the split core into the upper and/or lower plate can reduce material and manufacturing costs by eliminating two screws, a core, drilling and tapping operation, and screwing of three parts together at the assembly operation performed in traditional systems.

The magnetic actuator component 104 simultaneously provides an instantaneous trip and an induced delay trip capability. The magnetic actuator component 104 is not susceptible to the inefficient power based heat generation problems of bimetal thermal overload detectors. The magnetic actuator component 104 implements integrated mechanical movement of the plunger and the armature based on magnetic field strength driven by current load of the primary coil component 102 to break the contacts in a short circuit condition. As one non-limiting example, the magnetic actuator component 104 is designed as a spring loaded plunger acting as the armature of the primary coil component 102. Typically, the current in the primary coil component 102 can be measured indirectly by measuring the voltage drop across a burden resistor connected to the secondary coil component 106.

The secondary coil component 106 provides the voltage coil for allowing power supply of the electronics and detection of overload conditions. As previously described, the implementation of the design includes separate coils that are oriented inline to allow the use of a smaller form factor enclosure. As one example of the differences in the subject innovative design and a conventional design, is that a conventional design can include concentric dual coils. The physical geometry of requiring a secondary coil to wrap around the outer diameter of the primary coil prohibits the reduction in size of the enclosure because of the width requirements of the concentric coils.

The power supply component 108 provides power for the integrated measurement and communication aspects of the control system interface component 110. The power supply component 108 derives its source from the windings of the secondary coil component 106 and is designed to match the power supply requirements of the control system interface component 110. Moreover, under fault (e.g., short circuit) conditions, the core can saturate and limit excess current/power from being delivered to the control system electronics. The control system interface component 110 provides the electronics for the measurement of circuit breaker related data and the communication of the circuit breaker related data to other devices communicatively connected to the control system interface component 110. The control system interface component 110 collects data, such as, but not limited to, current flow of the primary coil, voltage of the secondary coil, temperature of the enclosure and its components and/or tripping events associated with overload conditions or remote shutdown. The control system interface component 110 communicates the collected information to most any devices communicatively connected to the control system interface component 110.

The overload detection component 112 provides for detecting a current overload in the primary coil based on an increasing magnetic field strength surrounding the magnetic actuator component 104, and the voltage overload in the secondary coil component 106 based on a remote shutdown supply voltage. The mechanisms of overload detection component 112 provide for instantaneous shutdown in short circuit conditions, but also allow delayed shutdown for overload conditions not involving a short circuit. In another aspect, the shutdown mechanisms disclosed herein accomplish this task without the inefficient generation of heat, as generated in conventional systems having a bimetal design for overload protection. It can be appreciated that although the low-cost CT design disclosed herein is described with respect to a circuit breaker system, the subject embodiments are not that limited and the disclosed CT design can be incorporated within most any current transformer, for example, utilized in most any power measurement devices and applications, including, but not limited to protective relays, analog devices, transducers, and/or PowerMonitor™ products.

Referring now to FIGS. 2A-D, the inline design of the dual coil system 100 is illustrated, wherein the magnetic actuator component 104 comprises a plunger type actuator 202, the primary coil component 102 comprises a current measuring primary coil 208 and the secondary coil component 106 comprises a current measuring secondary coil 210, wherein a voltage across the secondary coil 210 is measured, for example, by passing the secondary current through a burden resistor (not shown) and measuring the resulting burden resistor voltage drop. FIGS. 2A-D depict various views (200, 250) and cross-sections (225, 275) of the dual coil system 100. As seen from FIGS. 2A-D, the dual coil system 100 includes an inline (non-concentric) primary coil 208 and secondary coil 210 that enable the placement of the system 100 in standard enclosure designs (e.g., standard frame sizes). Typically, primary coil 208 has sufficient windings to provide enough power to support the data collection and the network communication, performed by the control system interface component 110. As an example, the dual coil system 100 can be utilized in a circuit breaker, for example, in motor control/protection (e.g., in manual motor controllers).

Figure 2A:
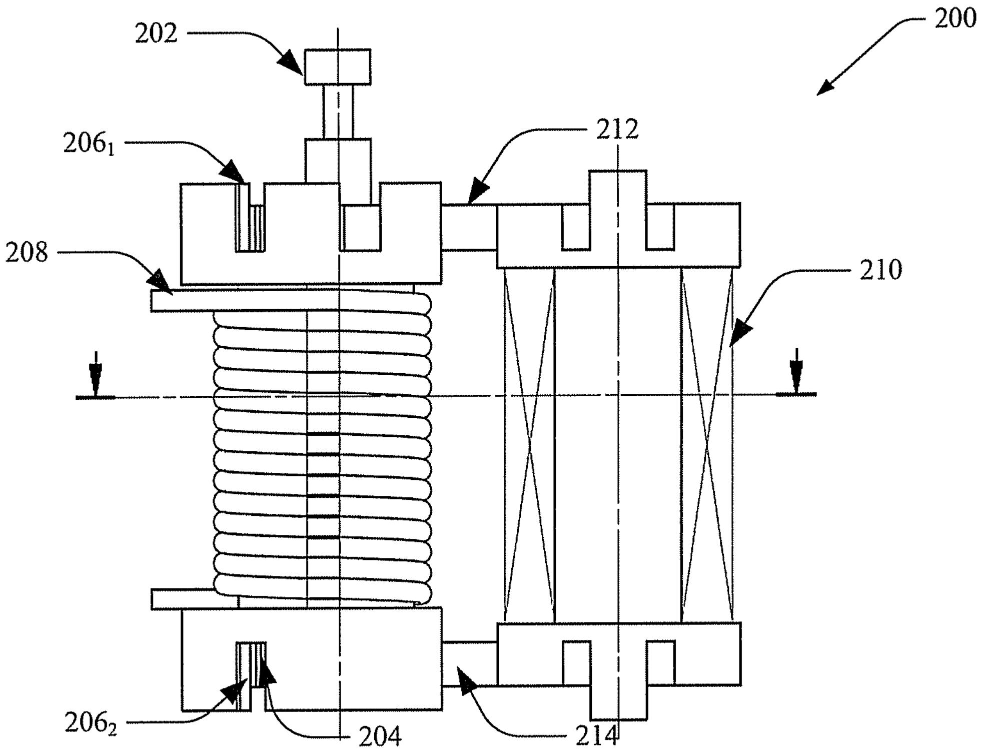
FIGS. 2A-D depict an inline design of the dual coil system with an integrated magnetic actuator and a split core.

FIG. 2A illustrates an elevation (side view) 200 of the dual coil system 100. The primary coil 208 and secondary coil 210 are held inline by a top plate 212 and a bottom plate 214. In one aspect, the CT-core is split into two portions, such that a portion is integrated within the top plate 212 and the bottom plate 214 respectively. Typically, the coil of the magnetic plunger 202 is used as a primary winding 208 of the current transformer, which provides power and current measurement signal to an electronic circuit (e.g., in the control system interface component 110). The amount of magnetic flux shunted away from the plunger actuator 202 is reduced by utilizing longitudinal lamination strips 204 embedded within the primary coil bobbin. As an example, an I-shaped lamination stack 204 can be utilized to abut to the ends of the current transformer top plate 212 and bottom plate 214. Moreover, the I-shaped laminations 204 are flexible in torsion and can self-align to the end plate surfaces through the use of spring clips $\mathbf{206}_1$, $\mathbf{206}_2$. The spring clips $\mathbf{206}_1$, $\mathbf{206}_2$ enable minimizing air gaps in the I-shaped laminations 204, resulting in higher transformation efficiencies, higher secondary output current, and improved current measurement linearity.

Figure 2B:
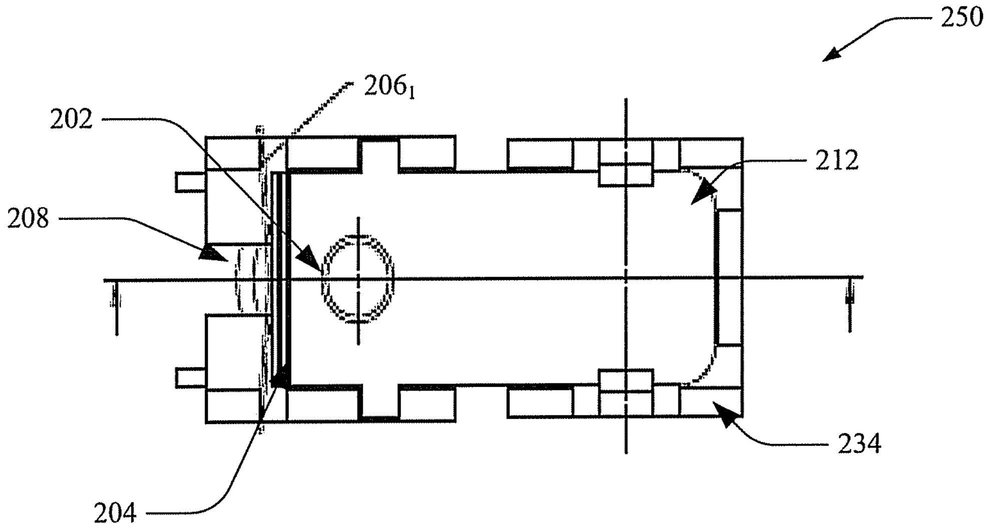

FIG. 2B illustrates a top view 250 of the dual coil system 100 that includes the split core design integrated into the top plate 212 and the bottom plate 214, which slide together and are retained by the secondary coil former 234. In one aspect, the two parts (top plate with split core and bottom plate with split core) can be manufactured by employing powder metal and/or metal injection molding process(es). This approach eliminates manufacture of three separate parts (top plate, bottom plate, and CT-core), drilling and tapping of holes within the top and bottom plates, machining operations, and tightening of two screws, employed conventionally to connect the core with the top and bottom plates at assembly. Accordingly, the split core design disclosed herein can reduce costs and decrease manufacturing and assembly time.

Figure 2C:
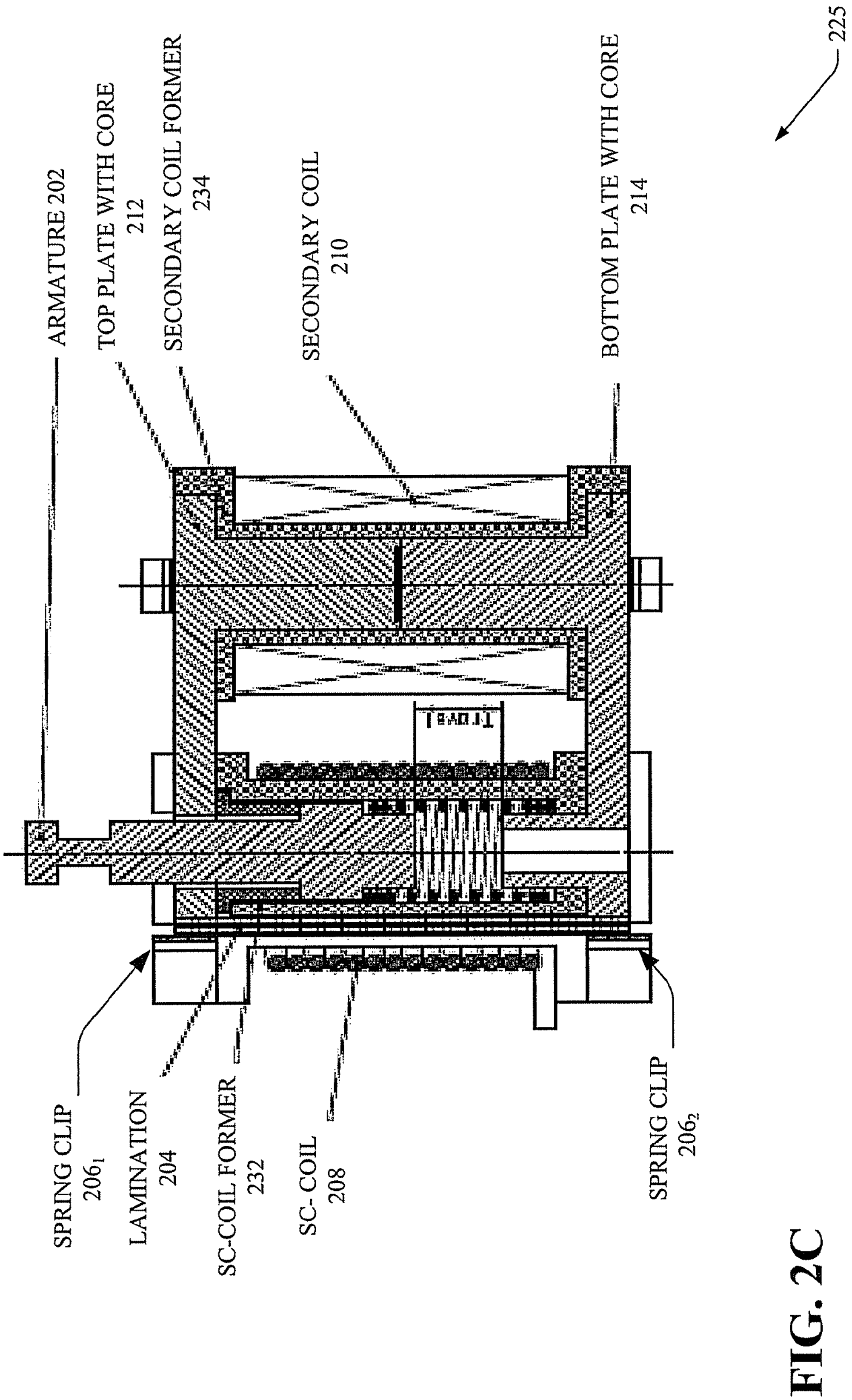
Figure 2D:
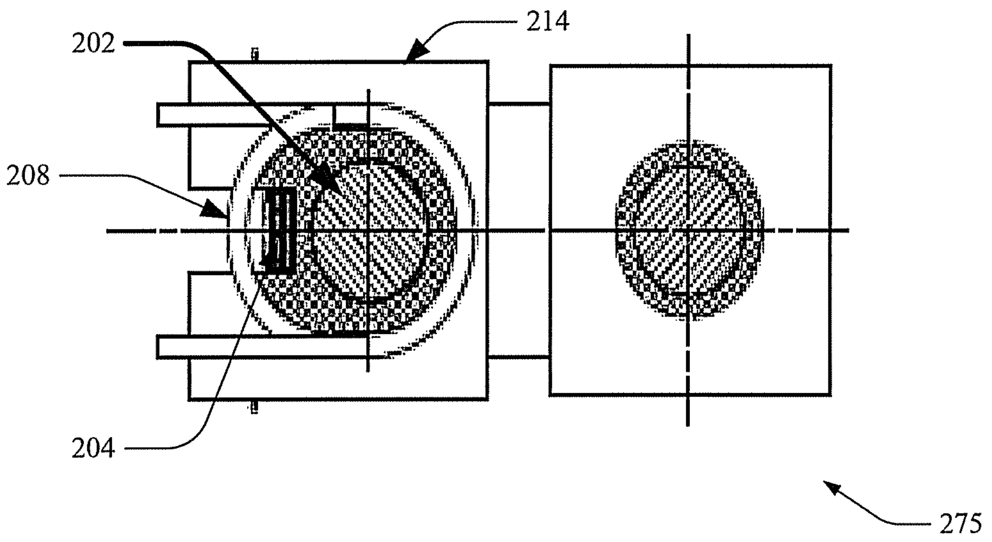

FIG. 2C illustrates a vertical (e.g., longitudinal) cross section 225 and FIG. 2D illustrates a horizontal (e.g., transverse) cross section 275 of the dual coil system 100 depicting a transverse split CT-core design. In an aspect, the CT-core is divided into two portions, such that each portion can be integrated with a respective plate (e.g., top or bottom plate). Although the cross section 225 illustrates an equal split, such that the CT-core is divided into two equal parts/halves, it can be appreciated, that the subject disclosure is not so limited, and that the CT-core can be divided into unequal parts of most any shape or size. Typically, the upper and lower plate, with the respective CT-core portion, can slide together to complete the assembly and can be retained within the secondary coil former 234. In one example, the upper and lower plate, with the respective CT-core portion, can be manufactured into net shapes utilizing powder metallurgy or metal injection molding processes. Various metals and/or metal alloys can be utilized to create the upper and lower plates, with the integrated CT-core portions, For example, HDM-1000 (plain iron), HDM-5030 (Fe-3% Si), HDM-2500 (50% Fe-50% Ni), HDM-3050 (Fe-5% Mo), HDM-7007 (Fe-0.45% P), HDM-7008 (Fe-0.8% P), 410L stainless steel, 434L stainless steel, etc. can be utilized to build the specific shapes for the upper and lower plates, with the integrated CT-core portions.

According to an aspect, the coil formers (232, 234) can employ a snap-on mechanism. For example, the coil formers (232, 234) can includes snappers at top and bottom of the primary coil 208 and the secondary coil 210 that serve as a lateral fixation/guidance. Typically, during operation the magnetic forces can pull the two portions of the CT-core together, however, the snappers can also facilitate alignment of the two portions of the CT-core. Moreover, the snappers can replace the conventional screws and the screw operations, saving costs and tedious operations.

Figure 3A:
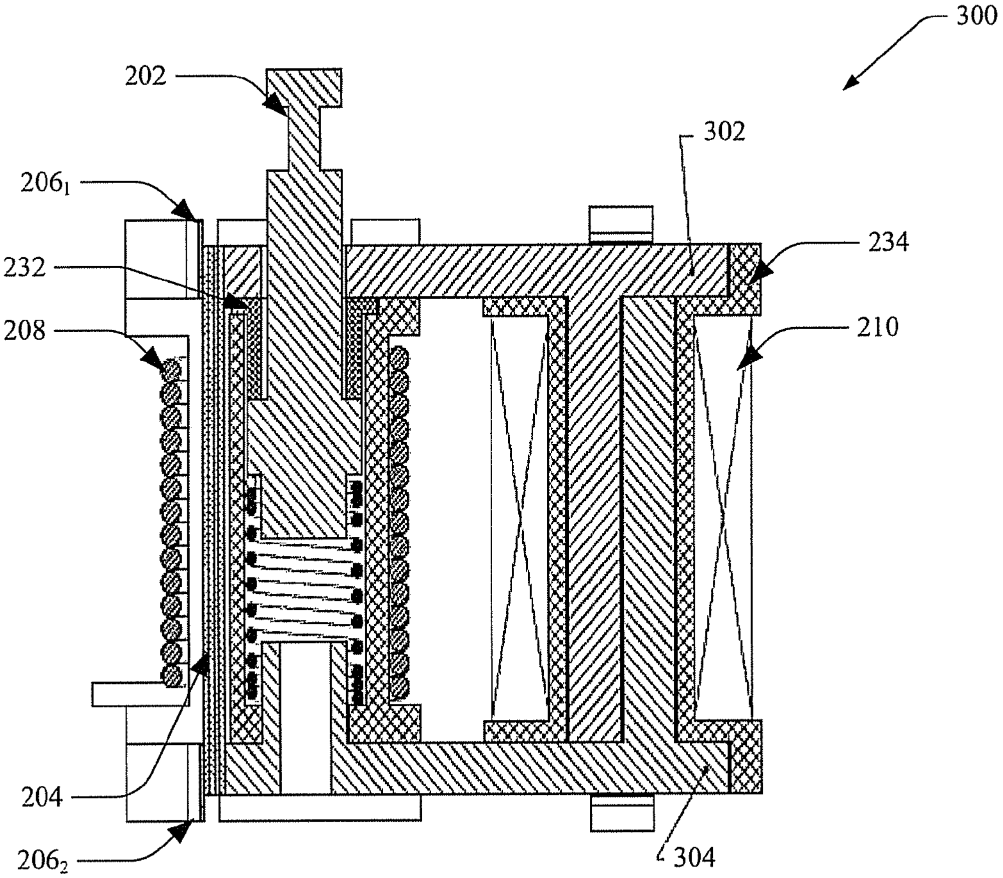
FIGS. 3A-B depict a cost effective design for a current transformer with an integrated actuator.
Figure 3B:
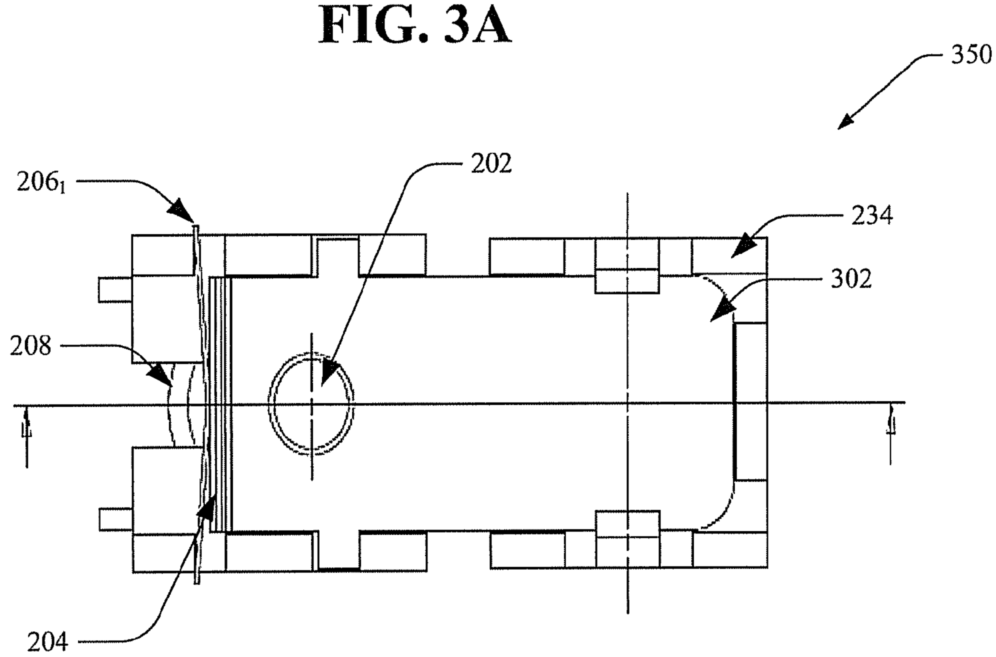

FIGS. 3A-B illustrate another example embodiment for a cost effective design for a current transformer with an integrated actuator. Moreover, FIG. 3A, illustrates a vertical cross-sectional view 300, while FIG. 3B illustrates a corresponding top view 350 of the example embodiment. According to an aspect, the current transformer core is comprised of two longitudinal sections that can slide together to form the current transformer core. Moreover, the sections are integrated within an upper plate 302 and a lower plate 304 respectively. Typically, the upper plate 302 and the lower plate 304 can be utilized to hold the primary coil 208 inline with the secondary coil 210. In this example, the cross-section of the upper plate 302 can have an asymmetrical T-shape (or L-shape), integrating a first section of the current transformer core. While, the lower plate 304 can have an inverted asymmetrical T-shape (or L-shape), integrating a second section of the current transformer core. The upper plate 302 (including the first section) and the lower plate 304 (including the second section) can be joint/coupled to each other (e.g., by sliding) within the secondary coil former 234, which employs a snap-on mechanism (e.g., by employing snappers described in detail supra). As noted above, the plate with an integrated portion of a CT-core, can have most ay shape, and is not limited to the size and/or shape of the sections illustrated in the figures. Moreover, the CT-core can be split is different ways, such as, but not limited to, longitudinally, crosswise, transversely, diagonally, etc.

Figure 4A:
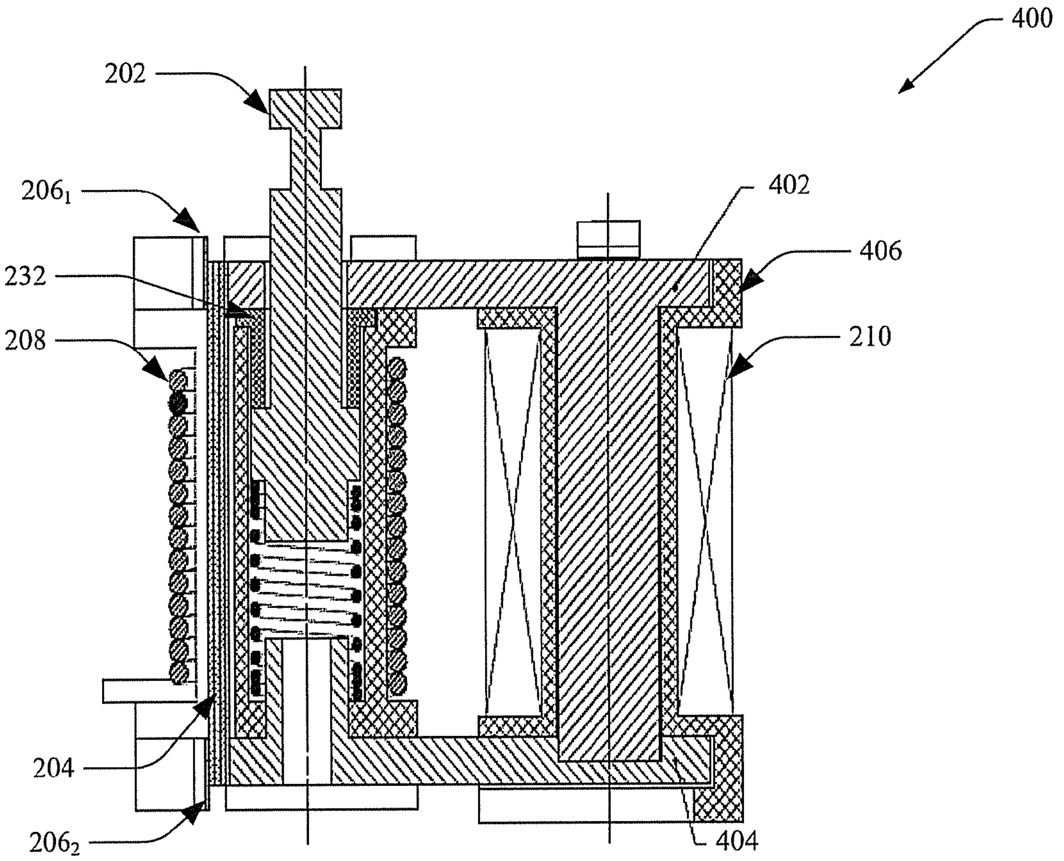
FIGS. 4A-B depict an example embodiment for a low-cost current transformer with an integrated actuator.
Figure 4B:
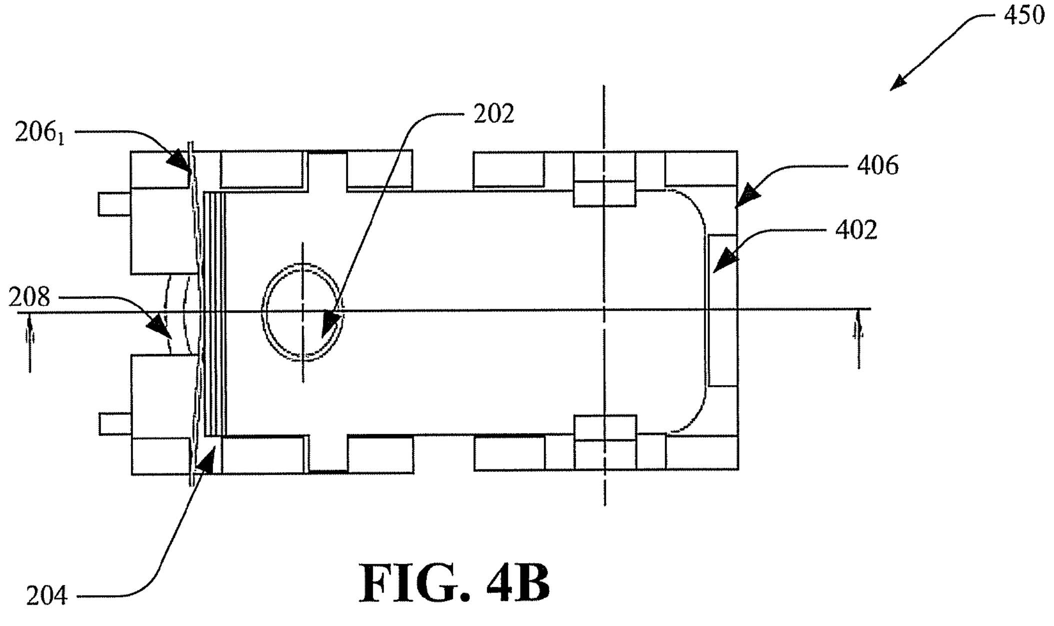

Referring now to FIGS. 4A-B, there illustrated is yet another example embodiment for a low-cost current transformer with an integrated actuator. Specifically, FIG. 4A, illustrates a vertical cross-sectional view 400, while FIG. 4B illustrates a corresponding top view 450 of the example embodiment. According to the embodiment, the current transformer with integrated magnetic actuator includes a primary coil 208 and a secondary coil 210 that are inline with each other (but not concentric). Moreover, an upper plate 402 and a lower plate 404 are utilized to position the coils inline. In one aspect, the upper plate 402 is integrated with the current transformer core, for example, by a powder metallurgy or metal injection molding processes. In another aspect, the lower plate 404 has a recess to hold the core portion of the upper plate 402. Moreover, integrating the entire CT-core in the upper plate 402 provides a better centration in a recess in the bottom plate 404. In addition, the recess in the bottom plate 404 helps position the magnetic circuit and minimize the loss of flux due to the junction surfaces.

Referring now to FIGS. 4A-B, there illustrated is yet another example embodiment for a low-cost current transformer with an integrated actuator. Specifically, FIG. 4A, illustrates a vertical cross-sectional view 400, while FIG. 4B illustrates a corresponding top view 450 of the example embodiment. According to the embodiment, the current transformer with integrated magnetic actuator includes a primary coil 208 and a secondary coil 210 that are inline with each other (but not concentric). Moreover, an upper plate 402 and a lower plate 404 are utilized to position the coils inline. In one aspect, the upper plate 402 is integrated with the current transformer core, for example, by a powder metallurgy or metal injection molding processes. In another aspect, the lower plate 404 has a recess to hold the core portion of the upper plate 402. Moreover, integrating the entire CT-core in the upper plate 402 provides a better centration in a recess in the bottom plate 404. Typically, the upper plate 402 (with the CT-core) and the bottom plate 404 (with the recess) are held in position by a coil former 406. In one example, a slide-in fixation of the coil former 406 and the bottom plate 404 can be provided. Although a slide-in fixation of the coil former 406 is illustrated, it can be appreciated that a coil former with a snap-on mechanism (e.g., as described above) can also be utilized.

Figure 5A:
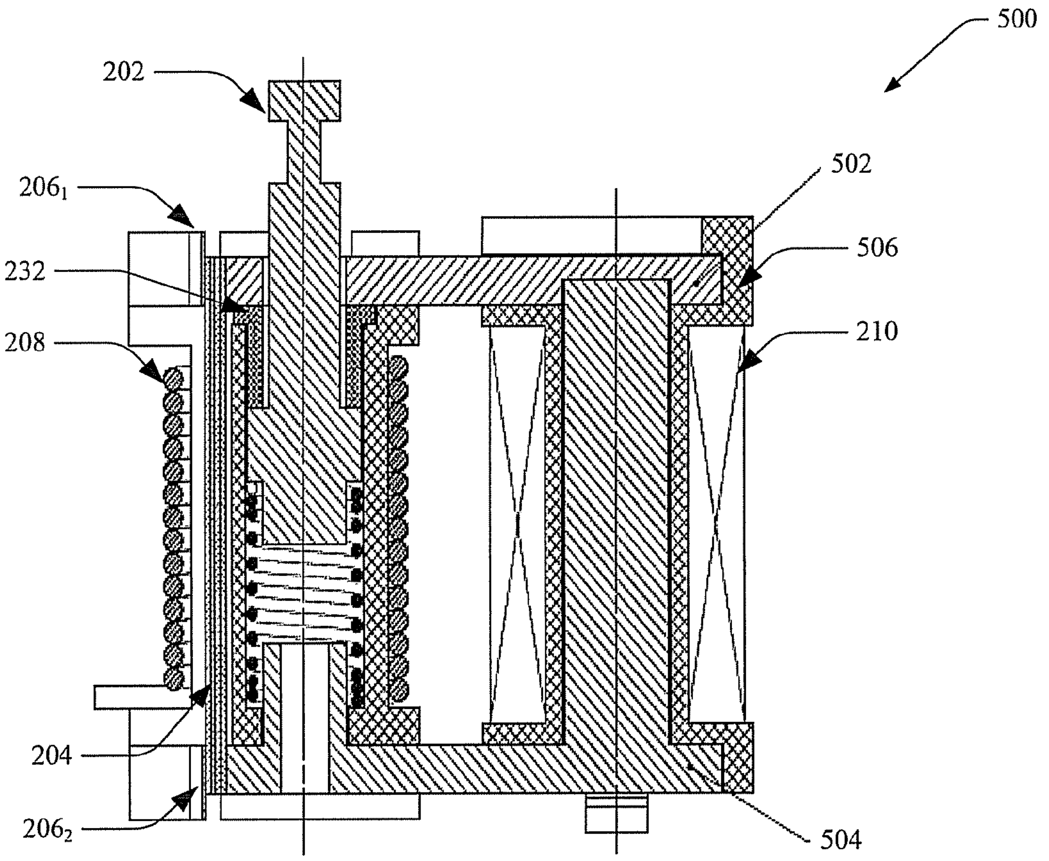
FIGS. 5A-B depict an example embodiment for an improved core and coil former design in a current transformer with an integrated actuator.
Figure 5B:
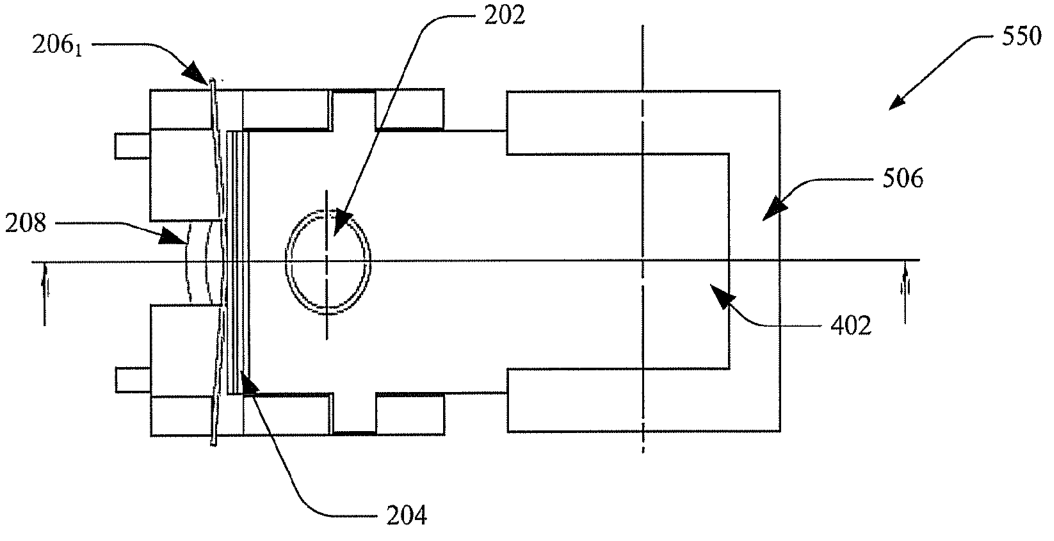

FIG. 5A-B illustrates still another example embodiment for an improved core and coil former design in a current transformer with an integrated actuator. In particular, FIG. 5A, illustrates a vertical cross-sectional view 500 of the current transformer and FIG. 5B illustrates a corresponding top view 550 of the current transformer. This example embodiment is similar to that depicted in FIG. 4A-B; however, in this example embodiment, the current transformer core is integrated within the lower plate 504 (e.g., by a powder metallurgy or metal injection molding processes) and the upper plate 502 includes a niche/recess to hold the core portion integrated into the lower plate 504. Typically, the niche in the upper plate 502 facilitates positioning of the magnetic circuit and minimizes loss of flux due to the junction surfaces.

During assembly, the core portion of the lower plate 504 can be placed in the niche of the upper plate 502 and can be retained by a coil former 506, which can slide over the upper plate 502. It can be appreciated that the subject embodiments are not limited to a coil former 506 with a slide-on mechanism, and that most any coil former design (e.g., coil former with a snap-on mechanism) can be utilized. In general, machining operations are eliminated, by employing a power metal or metal injection molding net shape process to create the upper plate 502 and/or the lower plate 504. Moreover, at least three parts and assembly screwing operations, employed in conventional systems are eliminated. In one aspect, the magnetic powder metal alloys, utilized to produce the upper plate 502 and/or the lower plate 504, typically provide higher electrical resistivity, which results in lower eddy current core losses and makes the current transformer more efficient.

Figure 6A:
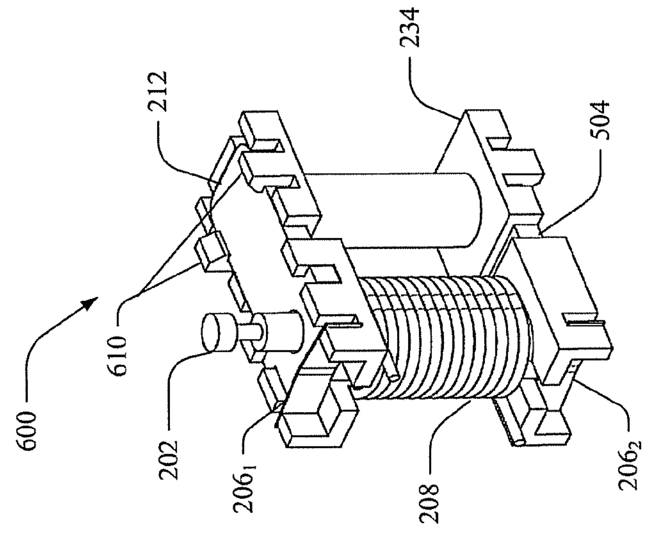
FIGS. 6A-C depict three-dimensional representations of various embodiments of the inline dual coil system.
Figure 6B:
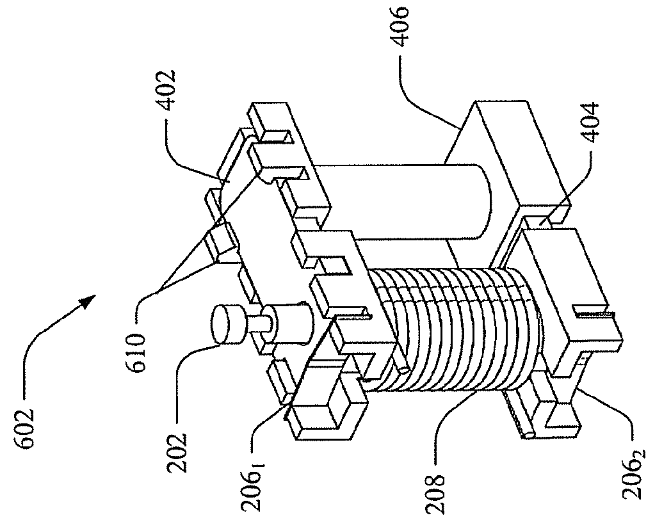
Figure 6C:
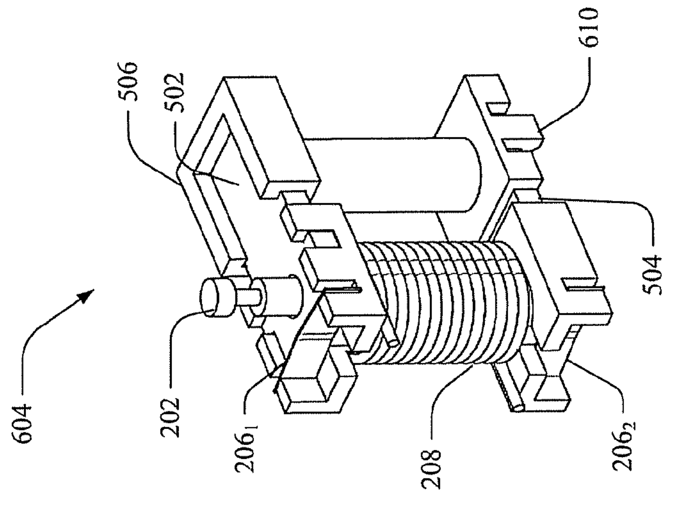

Referring to FIGS. 6A-C, three-dimensional depictions of various embodiments of the inline dual coil system are illustrated. The dual coil systems (600-604) include an inline primary coil 208 and secondary coil 210 (not shown), the plunger 202, and spring clips $\mathbf{206}_{1\text{-}2}$. Moreover, system 600, 602 and 604 correspond to embodiments, more fully described herein, with respect to FIGS. 2 and 3, 4, and 5 respectively. In an example, embodiment 600 illustrates the secondary former 234 that utilizes a snap-on mechanism to hold/retain/align the CT-core portions, while the embodiments 602 and 604 illustrate secondary formers (406, 506) that utilize a slide-on mechanism to hold/retain/align the CT-core portions at the bottom and top of the secondary coil 210 respectively. In one aspect, the coil former design of 600 includes snappers 610 at top and bottom of both primary and secondary coils (208, 210). In another aspect, the coil former design of 602 includes snappers 610 only at the top, while the coil former design of 604 includes snappers 610 only at the bottom of the secondary coil 210. Typically, during operation magnetic forces pull the two portions of the CT-core together, however, the snappers 610 can provide additional and accurate alignment/lateral fixation. Moreover, the snappers 610 can replace traditionally employed screws and screw operations.

Figure 7A:
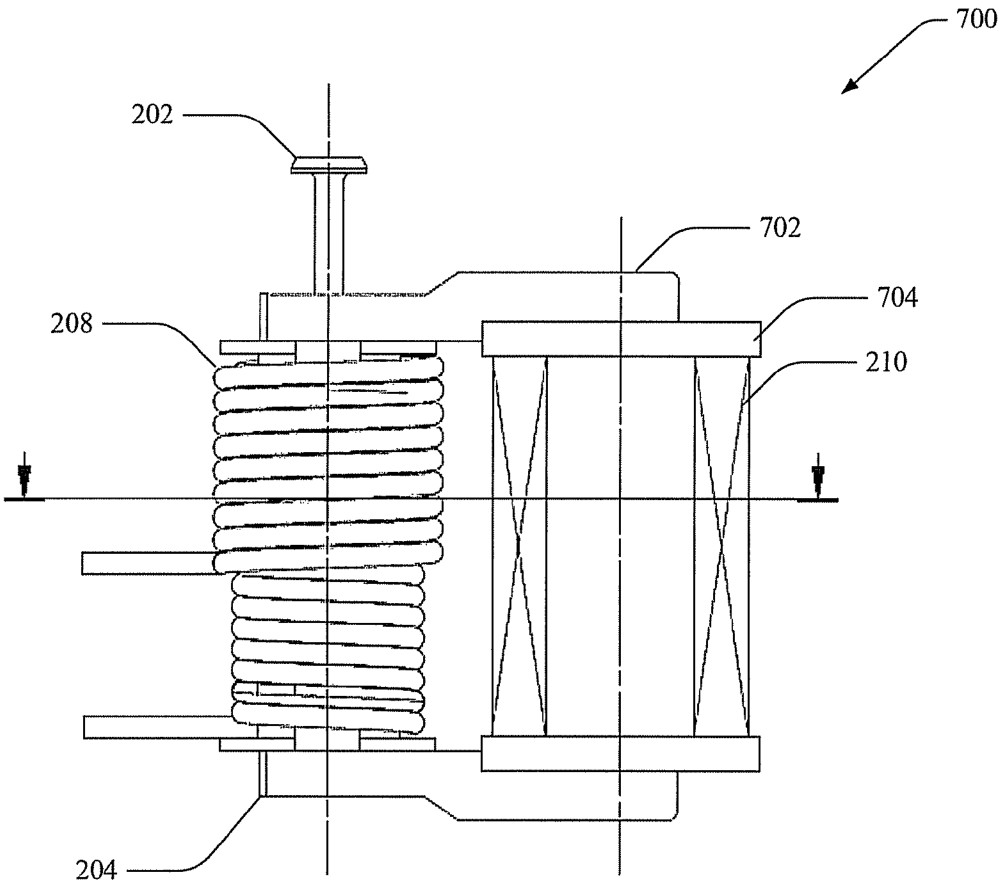
FIGS. 7A-F depict different views of a current transformer with an improved design for reducing assembly and production costs.
Figure 7B:
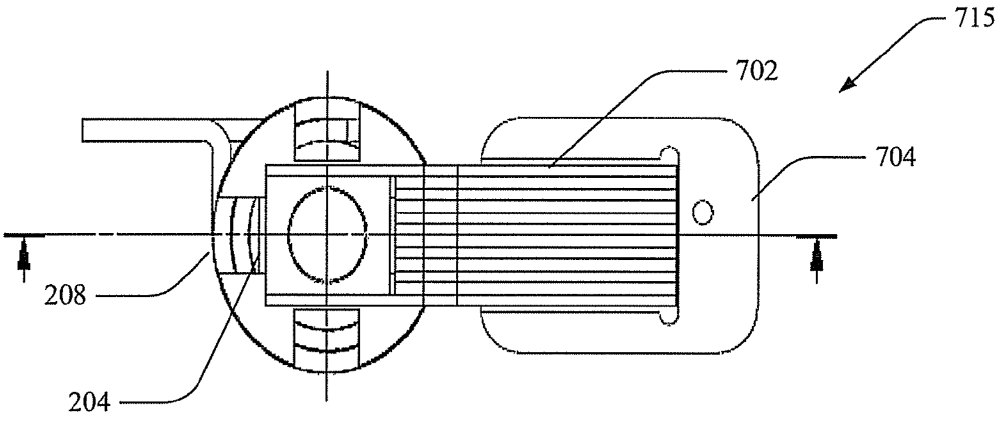
Figure 7C:
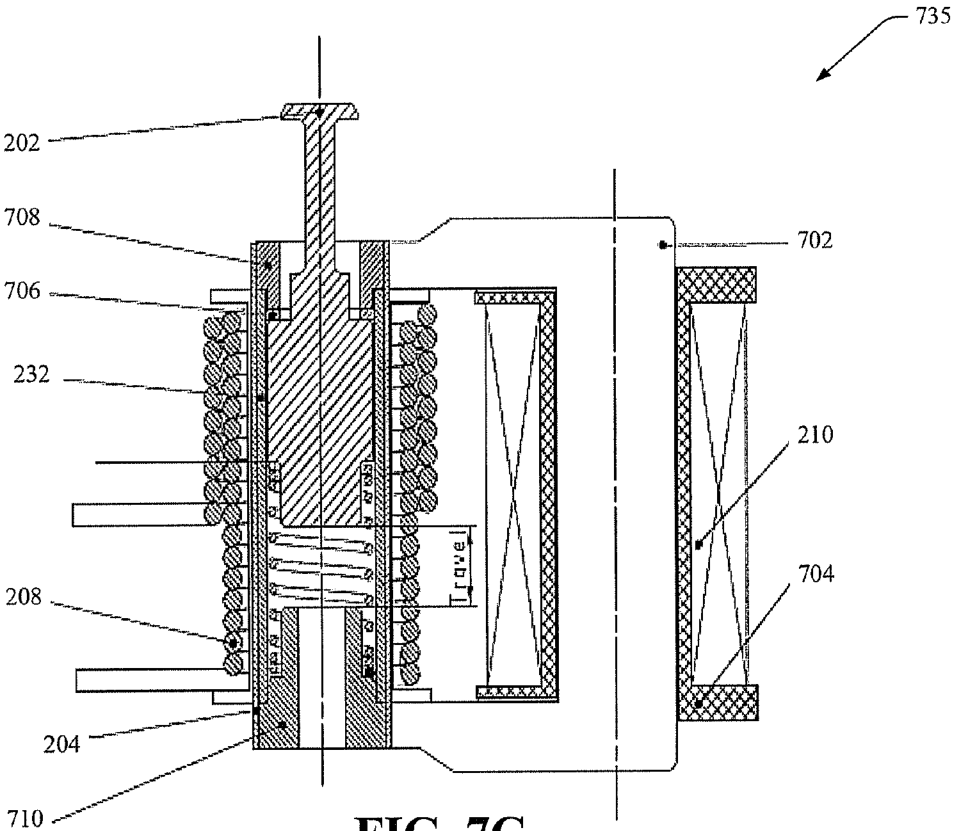
Figure 7D:
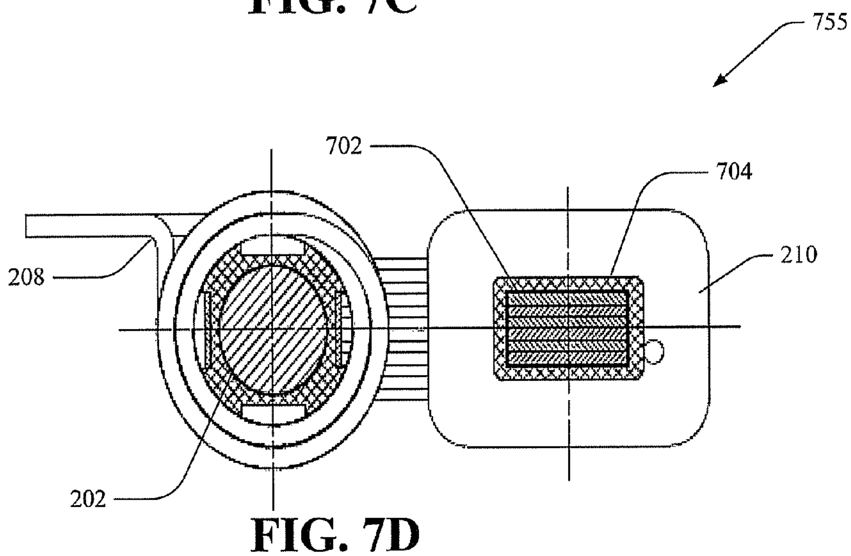
Figure 7E:
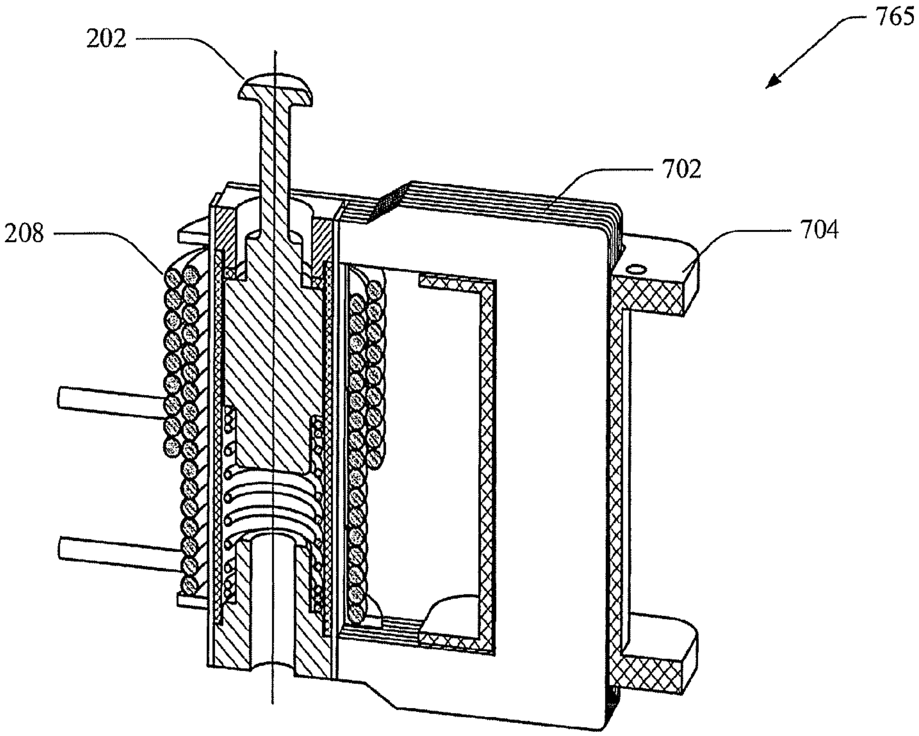
Figure 7F:
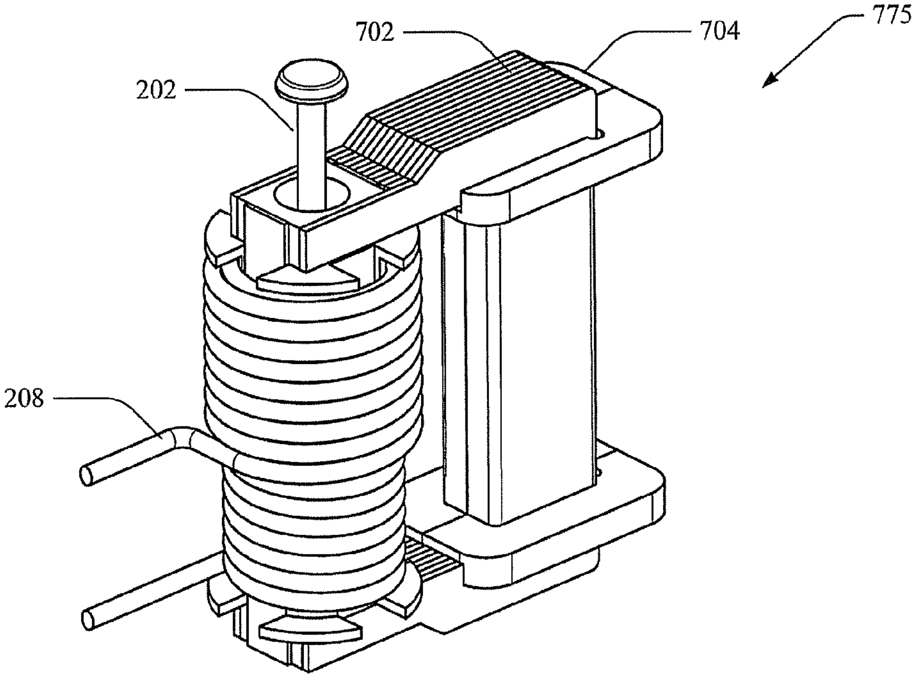

Referring now to FIGS. 7A-F, there illustrated are different views of a current transformer with an improved design for reducing assembly and production costs. In particular, FIG. 7A illustrates an elevation (side-view) 700 of the current transformer, FIG. 7B illustrates a top view 715 of the current transformer, FIG. 7C illustrates a vertical cross-sectional view 735 of the current transformer, FIG. 7D illustrates a horizontal cross-sectional view 755 of the current transformer, FIG. 7E illustrates a three dimensional cross-sectional view 765 of the current transformer, and FIG. 7F illustrates a three dimensional view 775 of the current transformer. In this embodiment, the CT-core 702 is designed as one U-shaped/C-shaped piece and/or as stack of U-shaped/C-shaped laminations. In other words, the upper plate, lower plate and CT-core are integrated into a single part (or stack) 702. This approach provides a higher degree of integration (e.g., by avoiding screws, and separate top and bottom plates). Typically, the rectangular shape of the core cross section enables smaller width and simultaneously larger cross section of the core and larger number of A-turns in the secondary coil 210. This design can substantially increase output efficiency of the current transformer. In one example, the core 702 can be made of different materials, such as, but not limited to laminated steel. Alternatively, the core 702 can be manufactured by employing a sintered material. In one aspect, the coil former 706 can be split in a longitudinal direction due to shape of the C-shaped/U-shaped core 702.

Typically the core 702 can be coupled to the primary coil with top core 708 and bottom core 710 parts (seen in 735). Moreover, the top core 708 and bottom core 710 couple the magnetic flux to the primary coil 208 and align/fix the primary coil 208 with the rest of the current transformer. A non-magnetic washer 706 can be placed at the top core 708 to avoid sticking of the armature 202 due to remanence. In general, the rectangular shape of the core cross section enables higher number of secondary windings and higher output power to feed the electronics (e.g., in the control system interface component 110). Moreover, the current transformer with this design of can be built with fewer assembly steps as compared to current transformers with traditional designs, thus reducing time and costs. For example, the disclosed current transformer can be pre-assembled in two subassemblies, for example, a "primary coil" subassembly and "C-shaped core with secondary coil" subassembly, which can then be locked together with the top core 708 and the bottom core 710. In one aspect, a lamination stack can be utilized with the primary coil 208, as described in detail in Annis et al., U.S. patent application Ser. No. 13/162,852, filed Jun. 17, 2011, entitled "Improved Magnetic Core Coupling in a Current Transformer with Integrated Magnetic Actuator;" the entirety of which is incorporated by reference herein.

Figure 8:
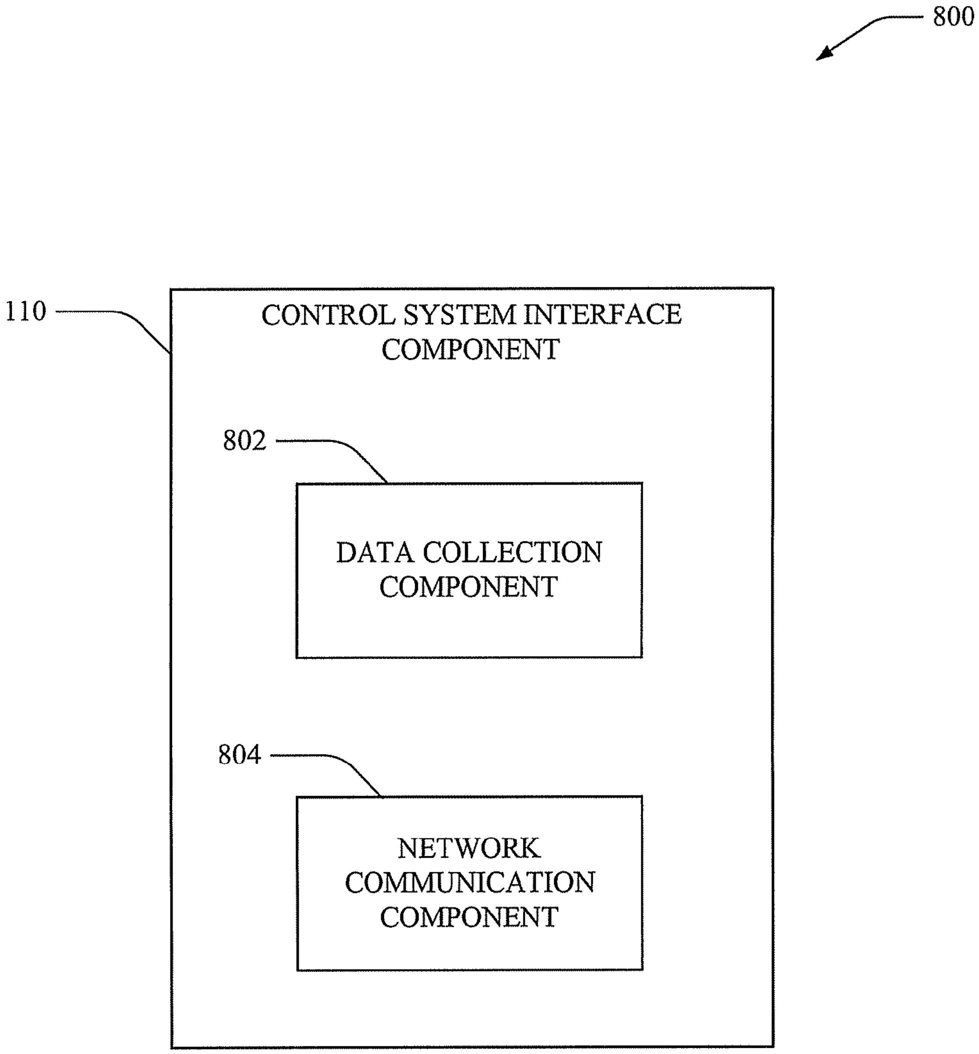
FIG. 8 depicts an example block diagram of a control system interface of a current transformer with an integrated magnetic actuator.

Referring to FIG. 8, there depicted in 800 the control system interface component 110 including the data collection component 802 and the network communication component 804. The data collection component 802 comprises measurement electronics suitable to measure the current of the primary coil component 102, the voltage of the secondary coil component 106, the voltage of the power supply component 108, the temperature of the enclosure components and/or the load exerted on a deflection spring of the plunger 202. The data measurements available to the data collection component 802 are provided to the network communication component 804 for transmission to other devices communicatively coupled to the control system interface component 110. The data can be processed and/or provided to another device for further analysis.

The network communication component 804 provides the ability to communicate with other devices on a network. For example, an industrial controller can interrogate the network communication component 804 over a control network and request the values of any data measureable by the data collection component 802. Further, the industrial controller can request the value of the current measurement for the primary coil and/or the temperature of the enclosure. The network communication component 804 can package the requested data in a format suitable for transfer over the connected control network and transmit the data to the requesting device.

In another aspect, the network communication component 804 can receive a communication comprising a command to perform an action, such as, but not limited to, opening the contacts. Upon receiving such a command, the network communication component 804 directs an overload voltage to the secondary coil and performs a remote shutdown. In another aspect, the network communication component 804 can communicate the occurrence of a shutdown, for any reason and by either coil, to a device communicatively coupled to the network communication component 804, without a prior request from the device for the data.

Figure 9:
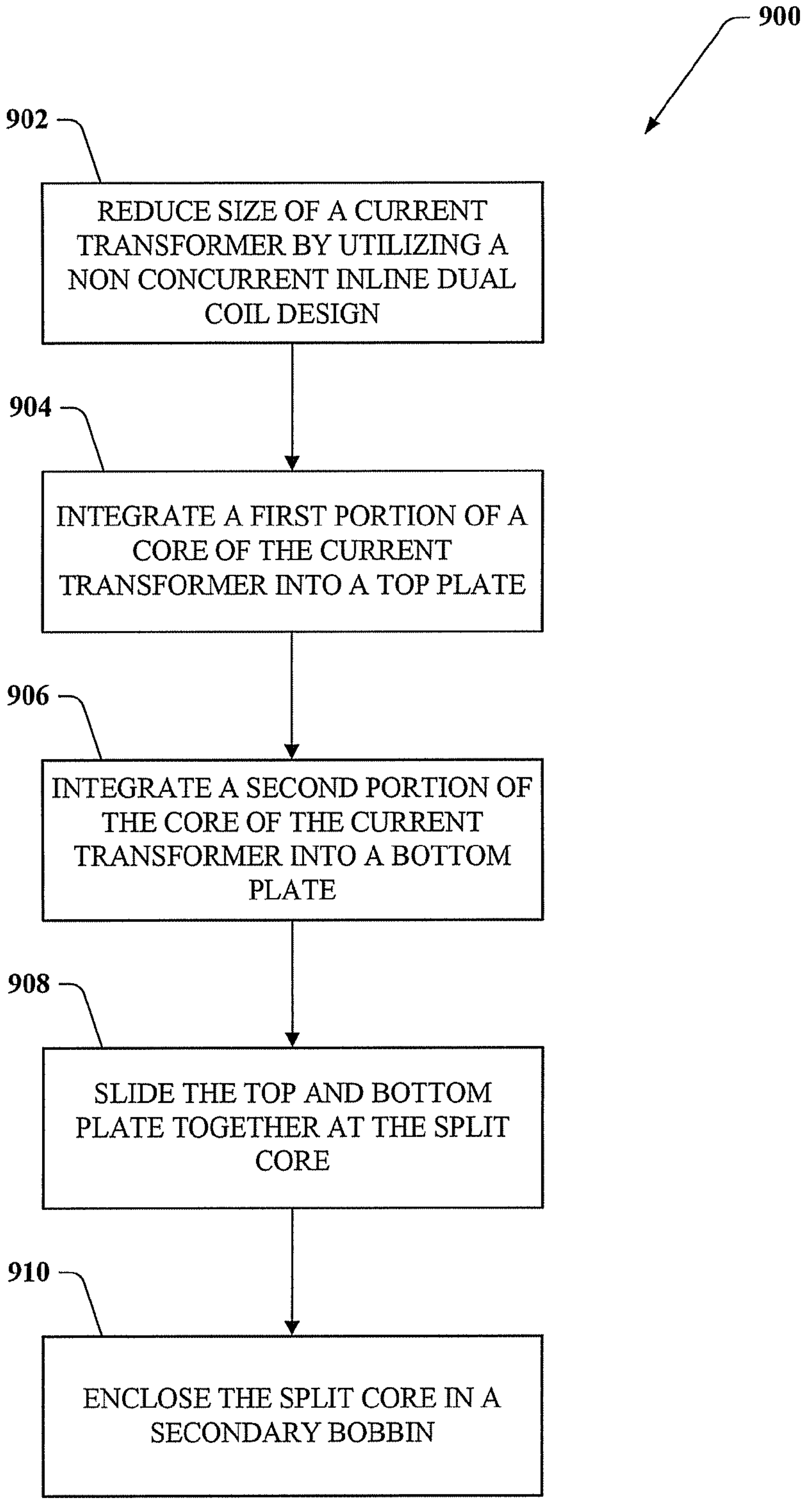
FIG. 9 depicts an example methodology to reduce assembly and manufacturing costs of a current transformer with an integrated magnetic actuator.

FIG. 9 illustrates an example methodology 900 and/or flow diagram in accordance with the disclosed subject matter. For simplicity of explanation, the methodology is depicted and described as a series of acts. It is to be understood and appreciated that the subject embodiments are not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

At 902, the size of a current transformer, with an integrated magnetic actuator, is reduced by employing a non concentric inline dual coil design. Since the coils are not concentric, the width of the current transformer can be significantly decreased. Moreover, a top and a bottom plate can be utilized to align and/or fix the coils inline with each other. In one aspect, the current transformer can be designed with a split core to reduce costs and assembly/production time. At 904, a first portion of the current transformer core can be integrated into the top plate, and at 906, a second portion of the current transformer core can be integrated into the bottom plate. In one example, the integrated parts can be manufactured by employing powder metal or metal injection molding processes. It can be appreciated that the first and second portions can be equal or unequal in shape or size. In one example, the entire core can be integrated within one of the plates and a recess provided in the other of the plates. Moreover, at 908, the top and bottom plates, with their respective portions of the core, can slide together at the split core. At 910, the split core can be enclosed/retained within a secondary bobbin.

Figure 10:
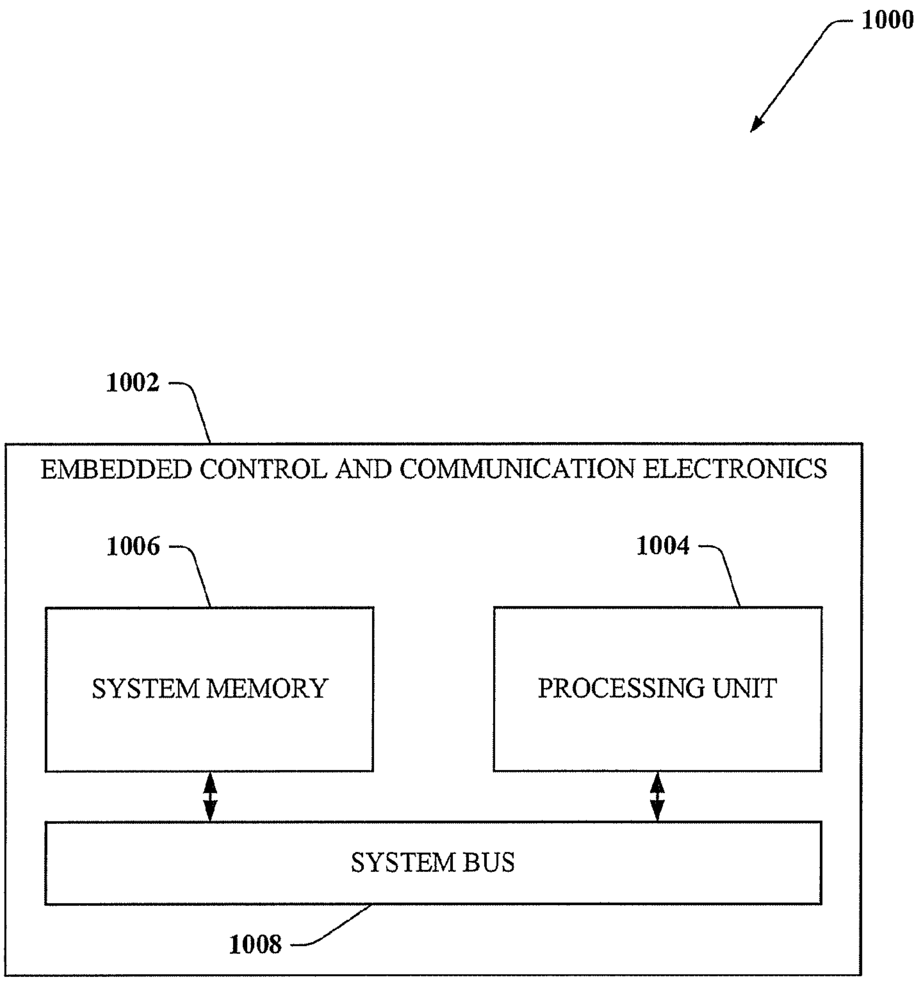
FIG. 10 a schematic block diagram illustrating a suitable operating environment for the embedded control and communication electronics.

With reference to FIG. 10, the exemplary computing environment 1000 for implementing various aspects of the subject embodiments, which includes embedded control and communication electronics 1002, including a processing unit 1004, a system memory 1006 and a system bus 1008. The system bus 1008 couples system components including, but not limited to, the system memory 1006 to the processing unit 1004. The processing unit 1004 can be any of various commercially available processors, such a single core processor, a multi-core processor, or any other suitable arrangement of processors. The system bus 1008 can be any of several types of bus structure that can further interconnect to a memory bus (with or without a memory controller), a peripheral bus, and a local bus using any of a variety of commercially available bus architectures. The system memory 1006 can include read-only memory (ROM), random access memory (RAM), high-speed RAM (such as static RAM), EPROM, EEPROM, and/or the like. Additionally or alternatively, the computer 1002 can include a hard disk drive, upon which program instructions, data, and the like can be retained. Moreover, removable data storage can be associated with the embedded control and communication electronics 1002. Hard disk drives, removable media, etc. can be communicatively coupled to the processing unit 1004 by way of the system bus 1008.

The system memory 1006 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the embedded control and communication electronics 1002 through one or more wired/wireless input devices, such as a keyboard, pointing and clicking mechanism, pressure sensitive screen, microphone, joystick, stylus pen, etc. A monitor or other type of interface can also be connected to the system bus 1008.

The embedded control and communication electronics 1002 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The embedded control and communication electronics 1002 can connect to other devices/networks by way of antenna, port, network interface adaptor, wireless access point, modem, and/or the like.

The embedded control and communication electronics 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

Figure 11:
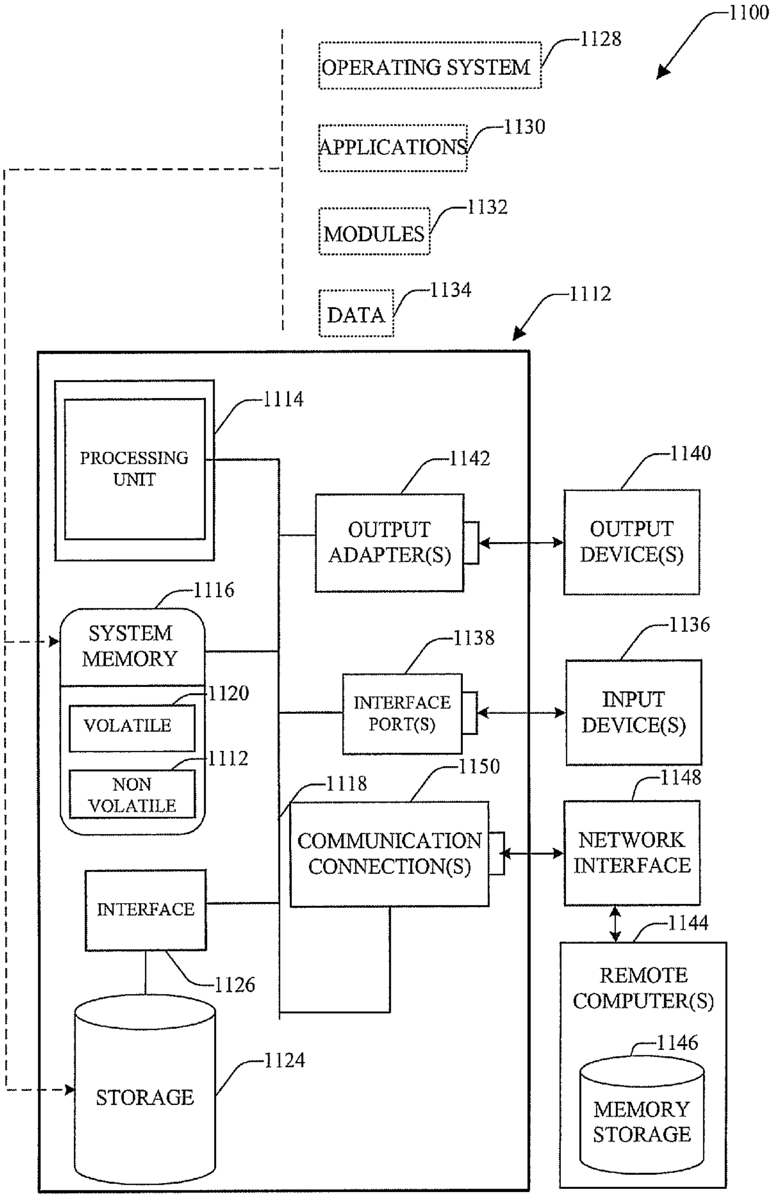
FIG. 11 depicts a schematic block diagram of a sample computing environment.

In order to provide a context for the various aspects of the disclosed subject matter, FIG. 11 as well as the following discussion is intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the various embodiments also may be implemented in combination with other program modules. Generally, program modules include routines, programs, components, data structures, etc. that performs particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the various embodiments can be practiced on stand-alone computers. In a distributed computing environment, program modules may be located in both local and remote memory storage devices.

With reference to FIG. 11, an exemplary environment 1100 for implementing various aspects disclosed herein includes a computer 1112 (e.g., desktop, laptop, server, hand held, programmable consumer or industrial electronics . . . ). Additionally, computer 1112 can comprise an actual target hardware system, and can comprise an embedded computer that has all the characteristics of environment 1100. The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the various embodiments can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

Figure 12:
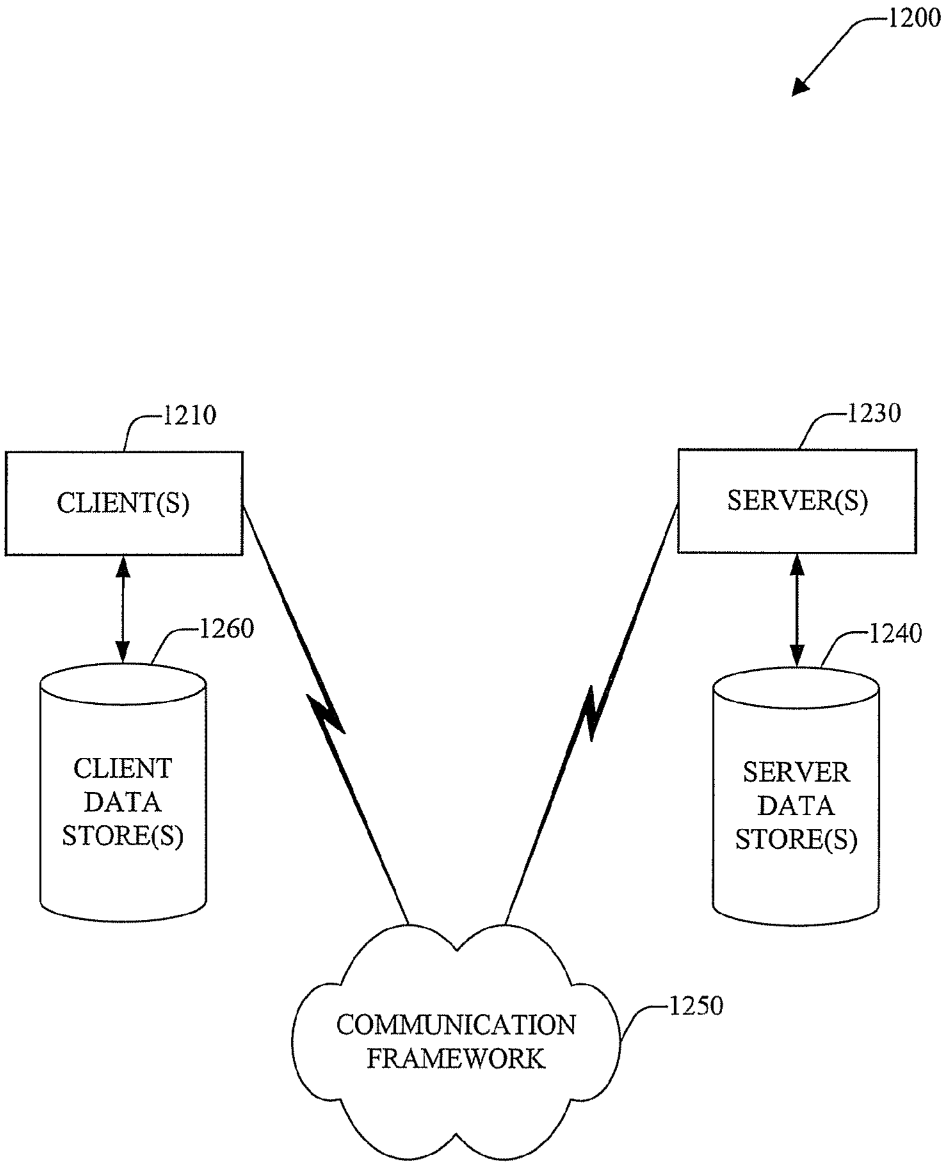
FIG. 12 depicts a schematic block diagram of a sample computing network environment.

FIG. 12 is a schematic block diagram of a sample-computing environment 1200 with which the various embodiments can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the various embodiments, for example. One possible communication between a client 1210 and a server 1230 may be in the form of a data packet adapted to be transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes example embodiments of the subject application. It is, of course, not possible to describe every conceivable combination of components or methodologies for purposes of describing the claimed subject matter, but one of ordinary skill in the art may recognize that many further combinations and permutations of the subject embodiments are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used, or modifications and additions can be made to the described embodiments, for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

It is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI) that communicate via the network which includes control, automation, and/or public networks. The industrial controller can also communicate to and control various other devices such as Input/Output modules including Analog, Digital, Programmed/Intelligent I/O modules, other industrial controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

The aforementioned systems/circuits/modules have been described with respect to interaction between several components. It can be appreciated that such systems/circuits and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject embodiments may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:

a current transformer comprising an integrated magnetic actuator component and configured to measure a current signal; and a plate configured to align a primary coil of the current transformer inline with a secondary coil of the current transformer, wherein at least a portion of a core of the current transformer is integrated within the plate based on injection molding.

2. The system of claim 1, wherein the plate is a first plate and the system further comprises, a second plate configured to align the primary coil and the secondary coil.

3. The system of claim 2, wherein the portion is a first portion and wherein a second portion of the core is integrated within the second plate.

4. The system of claim 3, wherein the core is split longitudinally into the first portion and the second portion.

5. The system of claim 3, wherein the core is split transversely into the first portion and the second portion.

6. The system of claim 2, wherein the second plate comprises a recess to hold the portion of the core.

7. The system of claim 2, further comprising, a secondary coil former coupled to one of the first plate or the second plate by employing a snap-on mechanism.

8. The system of claim 2, further comprising, a secondary coil former coupled to one of the first plate or the second plate by employing a slide-in mechanism.

9. The system of claim 2, wherein the second plate is integrated within the first plate to form a U-shaped part.

10. The system of claim 9, wherein the U-shaped part comprises a lamination stack.

11. The system of claim 1, wherein the injection molding comprises at least one of a powdered metal or metal injection process.

12. The system of claim 1, further comprising, a control system interface component configured to facilitate a communication of operational data related to the current transformer with an industrial automation device.

13. The system of claim 12, wherein the control system interface component is configured to determine circuit breaker related data, and is further configured to facilitate a transmission of the circuit breaker related data to a device communicatively coupled to the control system interface component.

14. The system of claim 1, further comprising, an overload measurement component configured to determine a current overload condition associated with the primary coil of the current transformer based on a determination that a magnetic field strength surrounding the integrated magnetic actuator component satisfies an overload criterion.

15. The system of claim 14, wherein the overload measurement component is further configured to determine a voltage overload condition associated with the secondary coil of the current transformer based on a determination of a remote shutdown of a supply voltage related to the current transformer.

16. A method, comprising:

measuring current through a first coil of a current transformer;

measuring voltage across a second coil of the current transformer that is wrapped around a split core; and aligning the second coil inline with the first coil by employing at least one of a top plate or a bottom plate that is integrated with the split core by utilizing injection molding.

17. The method of claim 16, further comprising, retaining the integrated split core in a bobbin by employing at least one of a snapping or a sliding mechanism.

18. The method of claim 16, further comprising, integrating the top plate, the bottom plate and the integrated split core into a single part.

19. An industrial apparatus, comprising:

a primary coil that provides current based short circuit protection; and, a secondary coil that provides voltage based overload protection, wherein the secondary coil is implemented inline with the primary coil by utilization of at least one plate integrated with at least a portion of a core, around which the secondary coil is wrapped, wherein the at least one plate is integrated with the at least the portion of the core by utilization of injection molding.

20. The industrial apparatus of claim 19, wherein the at least one plate is integrated with the at least the portion of the core based on powder metallurgy.

* * * * *